United States Patent [19]

Gutleber

[11] 4,032,884

[45] June 28, 1977

[54] ADAPTIVE TRUNK DATA TRANSMISSION SYSTEM

[75] Inventor: Frank S. Gutleber, Little Silver, N.J.

[73] Assignee: The United States of America as represented by the Secretary of the Army, Washington, D.C.

[22] Filed: Feb. 24, 1976

[21] Appl. No.: 660,967

[52] U.S. Cl. .......................... 340/146.1 E; 325/42; 325/323; 340/146.1 A X

[51] Int. Cl.² ...................................... G08C 25/00

[58] Field of Search ......... 340/146.1 E, 146.1 A X; 325/56, 41, 42, 323

[56] References Cited

UNITED STATES PATENTS

| | | | |
|---|---|---|---|
| 3,475,684 | 10/1969 | Covill | 325/323 |
| 3,532,988 | 10/1970 | Magnuski | 325/56 |
| 3,641,494 | 2/1972 | Parrault et al. | 340/146.1 BA |
| 3,696,210 | 10/1972 | Peterson et al. | 325/41 |
| 3,777,268 | 12/1973 | Cleobury et al. | 325/323 |
| 3,829,777 | 8/1974 | Muranti et al. | 340/146.1 A X |
| 3,831,093 | 8/1974 | Walker | 325/56 |
| 3,879,577 | 4/1975 | Progler | 340/146.1 BA |
| 3,934,224 | 1/1976 | Dulaney et al. | 340/146.1 A X |

OTHER PUBLICATIONS

Walker, Error Performance of A Class of Binary Comm. Systems in Fading and Noise, IEEE Transactions on Communications Systems, Mar. 1964, vol. CS-12, No. 1, pp. 28-45.

Coutts and Davis, Buffer Requirements for Intermittent Data Transmission over a Rayleigh Fading Channel, IEEE Transactions on Communications, vol. Com.-24, No. 10, Oct. 1976, pp. 1122-1129.

Primary Examiner—Charles E. Atkinson
Attorney, Agent, or Firm—Nathan Edelberg; Daniel D. Sharp; Sheldon Kanars

[57] ABSTRACT

An adaptive trunk data transmission system in which data bits to be communicated are not transmitted during certain fade durations of a multi-channel propagation characteristic, but are delayed instead, until the fade interval is over, when they are then transmitted.

7 Claims, 3 Drawing Figures

ADAPTIVE TRUNK DATA TRANSMISSION SYSTEM

The invention described herein may be manufactured and used by or for the Government for governmental purposes without the payment of any royalties thereon or therefor.

FIELD OF THE INVENTION

This invention relates to adaptive trunk data transmission systems and, more particularly, to such a system in which data bits are transmitted by means of a tropospheric scatter communications link.

BACKGROUND OF THE INVENTION

As is well known and understood, one of the problems in using the troposphere as a communications link for signal frequencies of the order of 1 gigahertz and higher is that the signal reflections will not generally be of constant amplitude. Because the tropospheric link is not homogeneous, the signal reflections change with time, being capable of experiencing at any one interval, a deep fade, a short fade, a more rapid or a less rapid fading of signal level. Where the tropospheric link is used in a switched communications system, as in a trunk multi-channel link, error rates can become prohibitively large. As is also known, a number of methods have been suggested in an attempt to combat these problems of fading—interleaving with error correction coding, automatic repeat request arrangements, and various diversity schemes, such as angle beam diversity or frequency band diversity. However, each of these methods are both costly to implement and complex in their operations, attempting, as they do, to continue the data transmission even during deep fade conditions.

SUMMARY OF THE INVENTION

As will become clear hereinafter, the adaptive trunk data transmission system of the present invention operates to measure the channel propagations characteristics of a trunk link in real time in order to locate those time fade durations which could result in unacceptable error performance over the multi-channel link. Instead of operating to continue the transmission of the data bits during these fade intervals, the system of the invention operates to then store the data bits, either in a buffer stage or in a delay line, and to transmit them when the fade is over. Although this approach for reducing error rate might require a large storage or delay line, the implementation of the technique for certain applications will be far simpler and less costly than those existing (and contemplated) alternative methods for otherwise reducing output error rate.

BRIEF DESCRIPTION OF THE DRAWING

These and other features of the present invention will be more clearly understood from a consideration of the following description, taken in connection with the accompanying drawing, in which.

DETAILED DESCRIPTION OF THE DRAWING

In the discussion that follows, it will be understood that the tropospheric link employed in the transmission system is a two-way link, on which transmissions of data proceed in each direction. As such, at each end of the system, there are both receiving and transmitting apparatus, for receiving information transmitted in one direction and for sending information out by means of the tropospheric medium in the opposite direction.

In accordance with the invention, one channel, or a part of one channel, will be held devoid of any signal information. This channel, or subchannel, will be gated out at the receiver, and fed to an output noise measuring system. The received signal level will also be measured from one or more of the remaining channels, to be compared with the measured noise level in establishing the existence of a fade condition during transmission, when the signal-to-noise ratio falls below a predetermined value. A control signal will be generated at that time, to be transmitted over the link in the reverse direction, to disable further data transmission, and to begin the storing of the data bits, either in the buffer stage or in the delay line. When the received signal-to-noise ratio rises again to the predetermined value, a second control signal will be transmitted along the link to activate the buffer or delay line apparatus, to begin the data transmission anew, sending out the previously stored bit information in serial fashion.

Figure 1:
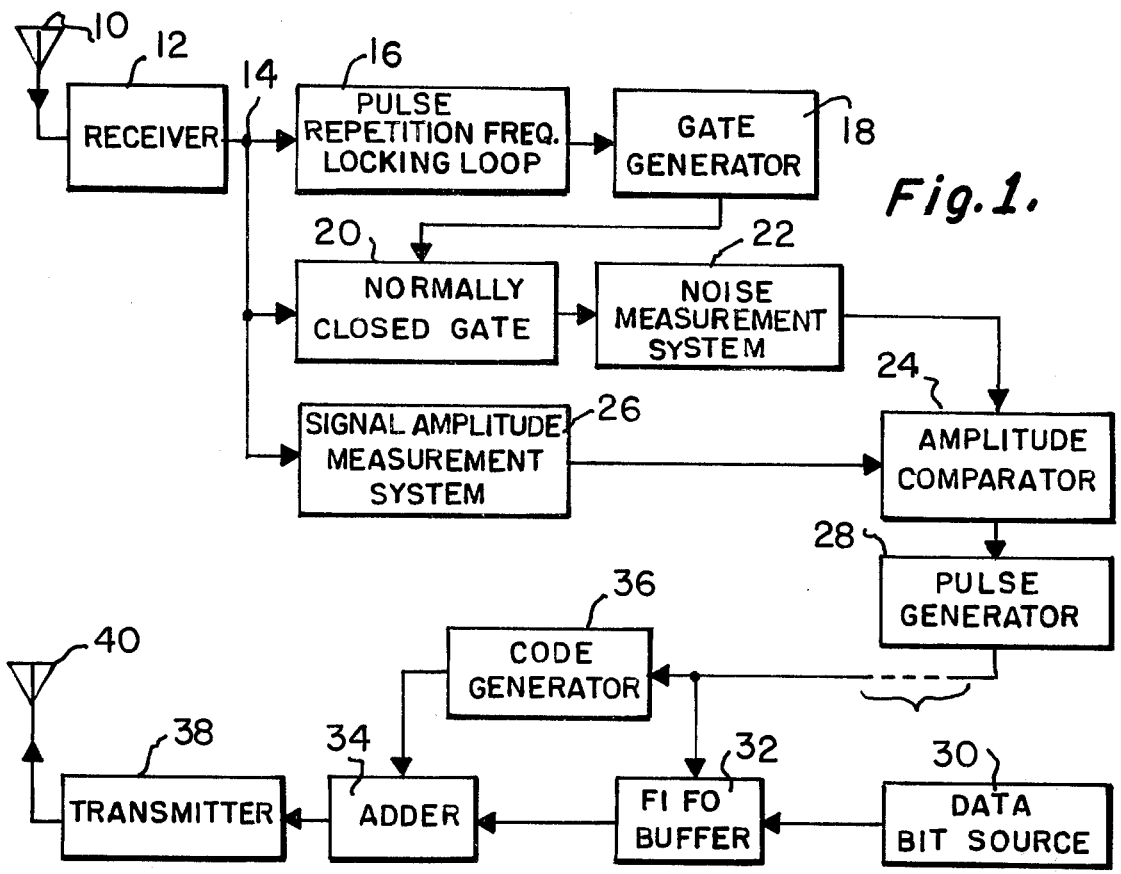
FIG. 1 is a block diagram of a portion of an adaptive trunk data transmission system constructed in accordance with the invention.

Referring, now, to FIG. 1, the data bits received by an antenna system 10 are coupled to an appropriate receiver 12 for reproduction thereat, and at an output terminal 14 of which, the re-created signal is made available. Synchronization is afforded by a pulse repetition frequency locking loop 16 in enabling a gate generator 18 to provide a control pulse synchronized with one, or a part of one, of the trunk channels left devoid of signal information. The control pulse generated activates a normally closed gate 20 to pass, for example, that one channel from the many channel inputs supplied it. A noise measurement system 22 receives that one channel input, and provides, as an output, a direct voltage level that is proportional to the r.m.s. noise signal amplitude. This voltage level is then applied to one input of an amplitude comparator 24.

To a second input of the comparator 24 is fed another direct voltage level, this time from a signal amplitude measurement system 26, which interrogates, for example, all the channels in providing an output voltage proportional to received signal information; alternatively, the system 26 could be a narrow band system to provide a precise measurement substantially only of the received signal, without any noise components being considered. The input to the signal amplitude measuring system 26 is, thus, also supplied from the output terminal 14 of receiver 12. A controllable pulse generator 28 is additionally included, of the type arranged to provide a pulse output when the signal-to-noise ratio in comparator 24 falls below a predetermined value, indicating a fade condition. The developed pulse, furthermore, will have a duration related to the time the signal-to-noise ratio remains below this value, being terminated when the predetermined value is again reached, as the fade interval comes to an end. The output from the generator 28 will be understood to be transmitted back along the tropospheric scatter link to the transmitting terminal.

At the transmitting terminal, data — in the form of teletype, facsimile, or other digital format — is supplied, in bit form, from a source 30 to, in one embodiment of the invention, a buffer stage 32. Specifically, the buffer 32 may be of the type arranged to store supplied data bits in response to a first control signal and to serially provide the stored bits as an output to an adder 34 in response to a second control signal, the supply to the adder 34 being such that the first bits stored in a sequence are also the first bits provided as an output. In this context, the buffer 32 can be termed a "first-in, first-out" storage unit, operating in much the same way that a delay line would operate in an alternative arrangement of the invention. It will be appreciated that the leading edge of the control pulse from generator 28 could serve as the first control signal, to direct the buffer 32 to begin its storing function, whereas the trailing edge of the pulse from generator 28 could serve as the second control signal, to direct the stored bits to be provided to adder 34. It will also be understood that in the absence of any control pulse from generator 28, the digital data from supply source 30 is arranged to pass through the buffer 32 directly to the adder 34, without storage.

A code generator 36 is also included at the transmitter terminal. This generator 36 is arranged to supply a first code signal to the adder 34 in response to the leading edge of the pulse from generator 28, and to supply a second code signal in response to the trailing edge of the pulse. In operation, the first code signal is supplied to indicate to the receiver (when transmitted via transmitter apparatus 38 and antenna 40) that subsequent data is about to be stored, as a fade duration has occurred where the error rate would be unacceptable. The second code signal is also transmitted via adder 34, transmitter apparatus 38 and antenna 40, but to indicate to the receiver that the fade duration has ended and that the data stored during the fade interval will next be transmitted along the tropospheric link. If the data to be sent from the source 30 is encrypted, then buffering will also be required at the receiver, on the opposite end of the link, to provide a continuous stream of information bits for further processing and/or transmission.

Figure 2:
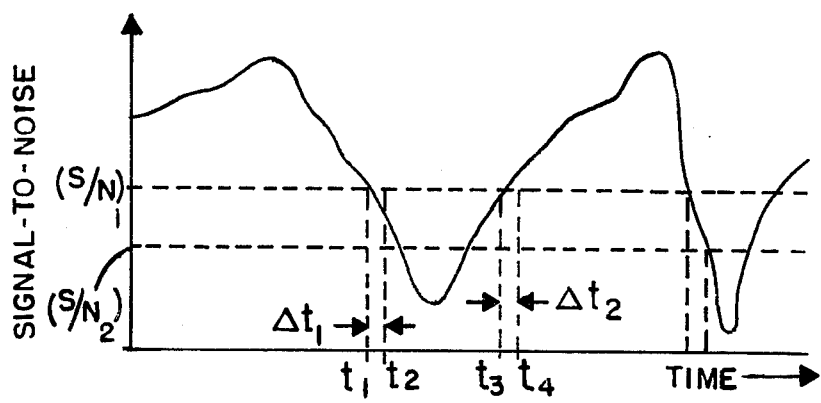
FIG. 2 is a timing diagram helpful in an understanding of the present invention.

The graph of FIG. 2 represents the general case of signal-to-noise ratio (S/N) recovered in amplitude comparator 24, plotted as a function of time. A cut-off threshold level $(S/N)_1$ is shown and is that level below which the pulse generator 28 supplies its control pulse. An operating threshold level $(S/N)_2$ is also shown, and is the minimum level for which an acceptable error rate performance is achieved over the tropospheric scatter communications link. When the signal-to-noise ratio falls to the cut-off threshold level (time $t_1$), pulse generator 28 begins to provide its control pulse to direct that the data bits from supply source 30 be stored instead of being transmitted, and to insert a code identifying signal to signify that the data bits are momentarily interrupted by a fade. The duration of the code, shown as $\Delta t$, between the time interval $t_1$ and $t_2$, is selected sufficiently short so that the code is concluded prior to the signal-to-noise ratio falling to the operating threshold, beyond which the reliability of its reception could be affected because of the high error rate performance. When the signal-to-noise ratio returns to the cut-off threshold, (time $t_3$) pulse generator 28 terminates its control pulse to direct that a second code signal be inserted to signify the end of the fade duration. At time $t_4$, the end of the second code duration, the transmission of the stored data bits resumes again. It will be apparent that the value set for the operating threshold level will depend upon the type of modulation, detection and/or coding employed on the link. It will also be apparent that in an operational system, the time at which the start code identifying signal begins can occur prior to the actual cut-off threshold being reached (i.e., $t_3$), if the fade statistics have been determined to be such that the cut-off threshold will be exceeded with a high probability prior to a next fade being encountered.

In implementing the system of this invention, certain requirements must be investigated. Perhaps foremost is the resolution of the rate of descent of the signal-to-noise ratio for signal fades which result in the signal-to-noise ratio falling below the cut-off threshold. Specifically, the value of the signal-to-noise ratio at the cut-off threshold must be sufficiently large to prevent the stop code signal from extending below the operating threshold during fades; otherwise, the stop code information could be lost. In addition, the stop code signal used to signify the existence of a fade interruption interval should be identifiable with a high probability of success. When these conditions are not satisfied, bit integrity could be lost — thereby limiting the usefulness of the described system. One way of insuring that these conditions will be satisfied is to use a sufficiently large cut-off threshold as compared to the operating threshold; alternatively, the code could be transmitted sufficiently fast to be concluded before the operating threshold is reached. Additionally, an optimum noise code could be used for the structure of the identifying code word, thus retaining bit integrity. In this latter context, the use of a noise code which compresses to a single impulse can be employed to precisely define the start and stop portions of the fade duration.

In designing the system of the invention, a pseudo-noise code generated by a P-N maximal shift register or a multiplexed perfect noise code could be used as the control signal for starting and stopping the data transmissions. Furthermore, as they provide an optimum code structure for timing and synchronization, and are readily constructed with reasonably simple hardware, these codes could also be used to provide the necessary timing accuracy for retaining bit integrity.

Figure 3:
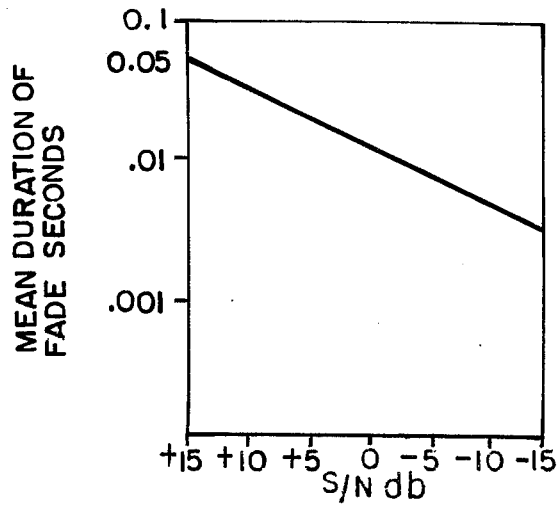
FIG. 3 is a graph of the fade characteristics of a tropospheric scatter communications link.

The required buffer size for the storage in unit 32 is both a function of the fade duration and of the bit rate. The required quantity of storage bits per fade can be determined by dividing the duration of the fade by the period of the bit rate. A plot of the mean fade duration versus signal-to-noise ratio for a tropospheric scatter link (4.4GHz – 100 mile path, scatter angle 0°40′) is generally as shown in FIG. 3, such that where a signal-to-noise ratio of +15 db would be adequate for the cut-off threshold, the fade duration would be 50ms; for a 32 Kb/s channel bit rate, the storage bit requirements would then be of the order of 1600 bits per channel per fade. As this represents a reasonably small bit storage requirement where the quantity of fades per message is small, the described approach can be extremely practical and competitive against other methods presently suggested for improving the transmission efficiency of a tropospheric link.

While there have been described what are considered to be preferred embodiments of the present invention, it will be readily apparent that modifications may be made by those skilled in the art without departing from the teachings herein of momentarily terminating data transmission during detected fade intervals, and then transmitting the stored data in sequence after the fade condition terminates. For example, an alternative method to determine when the cut-off threshold occurs in real time is to send a known sequence of signal bits over one of the channels and measuring the resultant bit error rate. By utilizing a signal structure that yields the same output error rate as that which is employed for the data bits, a direct measure of operating output error rate could be provided. However, one disadvantage of this technique is that an extra code generator, synchronization loop and error detector is generally required. For at least these reasons, therefore, the scope of the present invention should be read in light of the claims appended hereto.

I claim:

1. In a data transmission system employing a tropospheric scatter communications link as a communications medium, apparatus comprising:
   first means for measuring a propagation characteristic of said communications link to determine the error rate thereof; and
   second means continuously operative in connection with said first means to interrupt transmission of data in real time via said tropospheric scatter link when said measured propagation characteristic is indicative of an error rate of said link in excess of a predetermined value, said second means including means for delaying the transmission of the interrupted data to be transmitted until said measured propagation characteristic is indicative of an error rate not in excess of said predetermined value.

2. The apparatus of claim 1 wherein said first means is continuously operative to measure the signal-to-noise ratio of data transmitted via said tropospheric scatter communications link.

3. The apparatus of claim 1 wherein said means for delaying includes means for storing data to be transmitted while said measured propagation characteristic is indicative of an error rate beyond said predetermined value, and means for effecting transmission of said stored data in real time when said measured propagation characteristic is indicative of an error rate not in excess of said predetermined value.

4. The apparatus of claim 3 wherein said means for effecting transmission of data is operative to transmit said stored data in substantially the same sequence in which said data is stored.

5. The apparatus of clam 2 wherein said second means is operative to transmit a first identifiable code signal when the measured signal-to-noise ratio falls below a first predetermined level, prior to the interruption of data transmission via said tropospheric link.

6. The apparatus of claim 5 wherein said second means is also operative to transmit a second identifiable code signal when the measured signal-to-noise ratio rises from below said first predetermined level to reach said first level, with said second code signal being transmitted prior to the end of the data transmission interruption.

7. The apparatus of claim 6 wherein said first and second identifiable code signals are each of a duration shorter than the time for said signal-to-noise ratio to fall from said first predetermined level to a second predetermined level.

* * * * *